Dec. 22, 1936.  E. J. LAUTERBUR  2,065,079
WEIGHING, SIFTING, AND DELIVERING APPARATUS
Filed Nov. 29, 1933  4 Sheets-Sheet 1

INVENTOR.
Edward J. Lauterbur
BY
Allen & Allen
ATTORNEYS.

Dec. 22, 1936.  E. J. LAUTERBUR  2,065,079
WEIGHING, SIFTING, AND DELIVERING APPARATUS
Filed Nov. 29, 1933  4 Sheets—Sheet 2
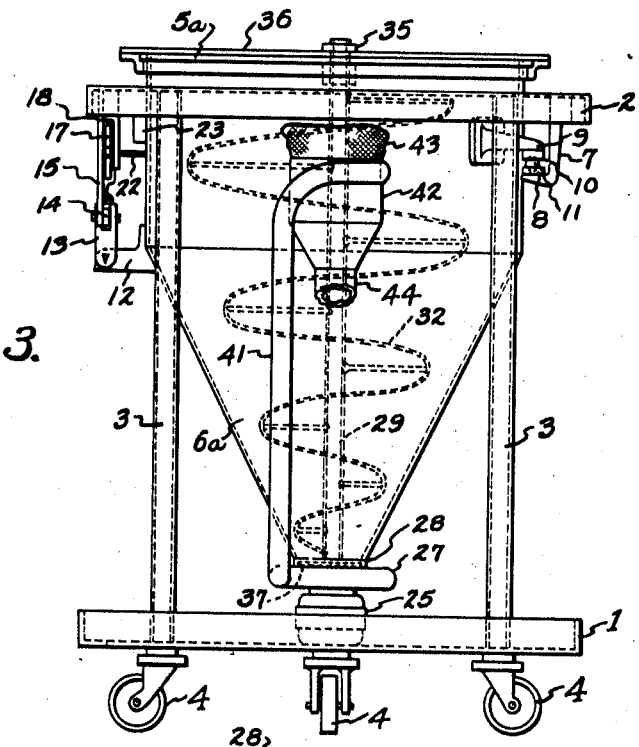
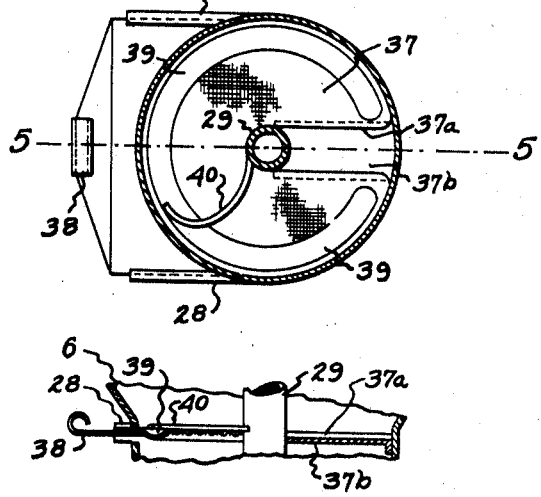
INVENTOR.
Edward J. Lauterbur
BY
Allen & Allen
ATTORNEYS.

Dec. 22, 1936.  E. J. LAUTERBUR  2,065,079
WEIGHING, SIFTING, AND DELIVERING APPARATUS
Filed Nov. 29, 1933   4 Sheets-Sheet 3
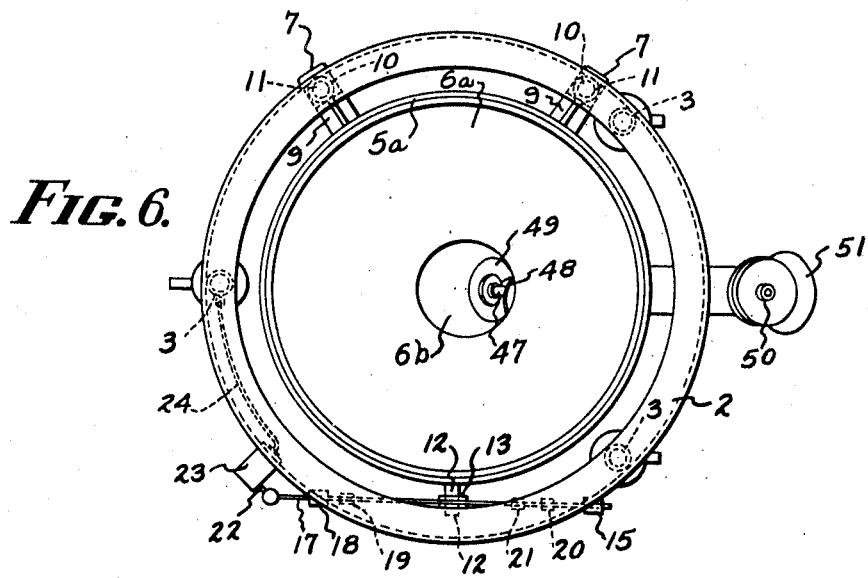
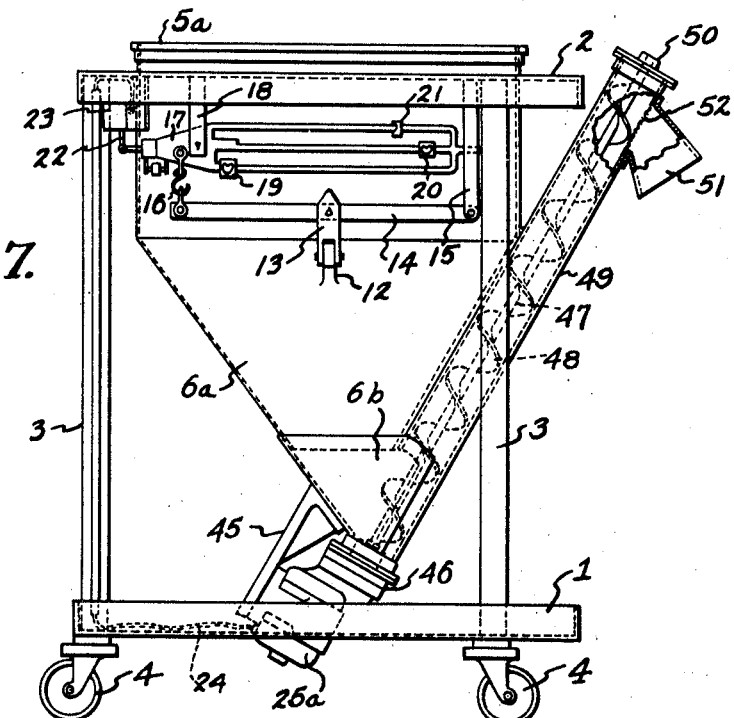
INVENTOR.
Edward J. Lauterbur
BY
Allen & Allen
ATTORNEYS.

Dec. 22, 1936.      E. J. LAUTERBUR      2,065,079
WEIGHING, SIFTING, AND DELIVERING APPARATUS
Filed Nov. 29, 1933      4 Sheets-Sheet 4

INVENTOR.
Edward J. Lauterbur
BY
Allen & Allen
ATTORNEYS.

Patented Dec. 22, 1936

2,065,079

UNITED STATES PATENT OFFICE 2,065,079

WEIGHING, SIFTING, AND DELIVERING APPARATUS

Edward J. Lauterbur, Sidney, Ohio

Application November 29, 1933, Serial No. 700,341

4 Claims. (Cl. 209—240)

My invention relates to apparatus for the handling, treatment and dispensing of finely divided materials, and more especially to such apparatus particularly designed for such operations upon flour and the like, in bakeries.

One object of my invention is to provide apparatus of that character, of compact and simple construction, with ample efficiency relative to its size and weight, and preferably to have such apparatus readily movable from place to place in the bakery, for operation in conjunction with any one of several apparatus to which the flour or the like is to be delivered from my apparatus.

A further object is to provide for weighing the flour or the like which is treated and delivered, in an especially convenient manner. It also is an object to provide for automatic control of the apparatus by the weighing means, so that a desired weighed quantity of the flour or the like may be delivered by the apparatus with a minimum of care and attention by the operator, and so that the accuracy of the weighing may be better insured than with apparatus depending more fully upon the operator's care.

A further object is to provide for effective sifting of the flour or the like, incident to the delivering operation of the apparatus. It also is an object to afford a combined sifting and diffusing operation upon the flour or the like, by which the material may be delivered in uniform condition for effective operation thereon in a mixer or other apparatus to which the delivery is made.

A further object is to provide for the sifting and diffusion by a construction which is especially simple and effective and which is arranged on compact form consistent with the general object of having the apparatus of small bulk and adapted for being readily moved about as before mentioned.

Other objects will appear in the course of the following description, illustrated by the accompanying drawings, in which—

Figure 3 is a side elevation of the same.

Figure 4 is an enlarged sectional plan view, the section being on the line 4—4 of Figure 2.

Figure 5 is a vertical longitudinal section on the line 5—5 of Figure 4.

Figure 6 is a plan view of a device embodying a modification of my invention.

Figure 7 is a front elevation of the same.

Figure 8:
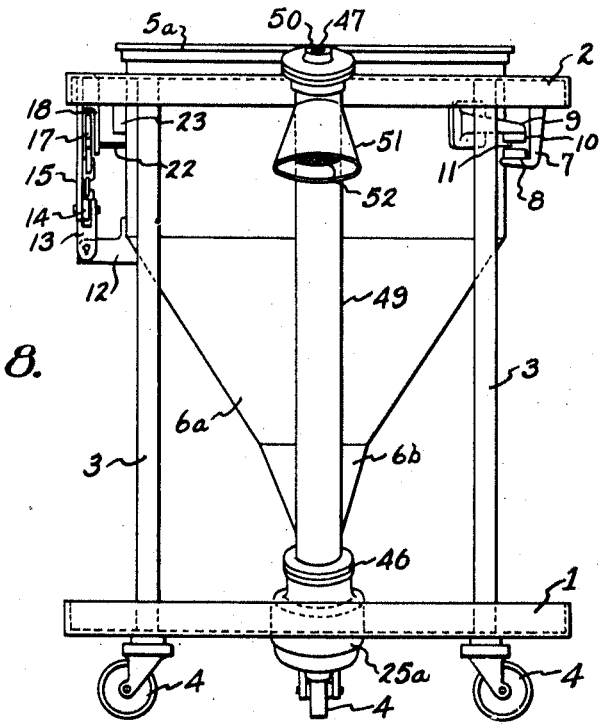
Figure 8 is a side elevation of the same.

As I prefer to construct my improved portable apparatus, referring either to the example of Figs. 1 to 5, inclusive, or to that of Figures 6 and 8, there is a frame comprising a bottom member 1 and a top member 2, each of circular ring shape made by bending an angle bar into that shape with its horizontal flange radially inward; and three posts 3 of tubular form, such as may be made of steel pipe, connecting the two rings 1 and 2, one post being at one side and the other two posts being at the other side of the frame. Mounted on the under side of the bottom ring 1 are three casters 4, under the respective posts 3, of the swivel type, making the apparatus easy to roll along the floor in any direction.

The bin or hopper 5, as shown in Figs. 1 to 5, inclusive, comprises a cylindrical minor upper portion and a conical major lower portion or bottom 6 tapering downward from the upper portion. Depending from the upper ring 2 at the rear, equidistant from the middle of the frame, are frame brackets 7 of L-shape with their lower horizontal parts projecting radially inwardly of the frame; each having on the top of its inner end portion a socket 8. Brackets 9 extend radially from the upper part of the hopper 6, over the respective frame bracket lower portions, and have inverted sockets 10 registering with the frame bracket sockets 8; and between each two registering brackets 8 and 10 is a ball 11. These form pivotal mountings for the rear part of the hopper 6, on which it may swing up and down.

Extending forward from the front of the upper part of the hopper 6, on the median front-to-rear line of the apparatus is the front hopper bracket 12, up from which extends a link 13, pivoted to the bracket 12 and hanging on knife edges on a portion of a floating beam 14 intermediate of the ends thereof. The right end of this beam 14 is pivoted to the lower end of a hanger 15 depending from the top frame ring 2; and the left end of this floating beam 15 is connected by the upwardly extending link 16 to the part of the scale beam 17 at the left of the scale beam hanger 18, close to the knife edge support of the scale beam on this hanger. This scale beam 17 comprises a lower, a middle and an upper beam section, on which slide, respectively, the poises 19, 20 and 21. The lower poise 19 is shifted to the right to weigh and balance the amount of flour or the like in the hopper 6. The other two poises 20 and 21, known as the discharge poises, are moved to the left to indicate the amount of flour or the like to be discharged from the apparatus.

The scale beam 17 has an extension connection 22 to one of the contact elements of a switch 23 which, by conductors 24 is in circuit with the motor 25, and with manual control switch means later to be described, and which is shown diagrammatically in Fig. 9.

The motor 25 is disposed with its shaft vertical; and fixed on its shaft, above the motor, are the radial blower vanes 26 within the blower casing 27 fixed to the upper end of the motor casing. The top of this blower casing 27 is fixed to the lower end of the hopper 6 by the sifter screen casing 28. A tubular shaft 29, of ample size for induction of air, extends axially up through the hopper 5, and has an open hub element 30 on its lower end, connecting it to the motor and blower shaft 31 in such manner as to leave a free outlet for the air from the bottom end of the tubular shaft 29 into the blower casing 27 below the screen casing 28.

Figure 1:
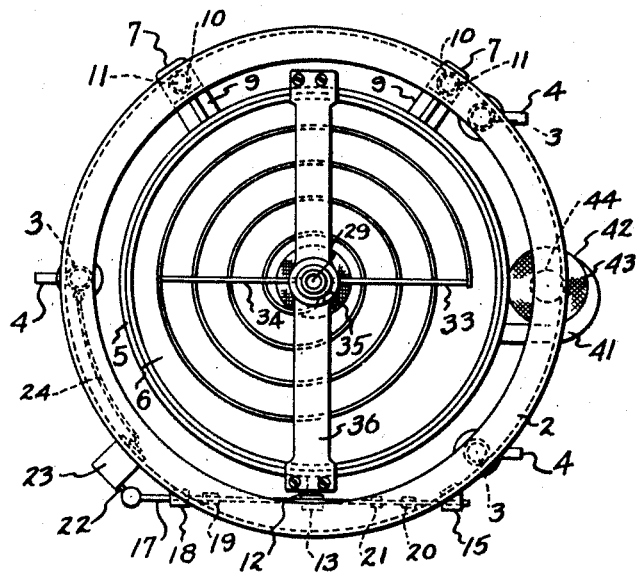
Figure 1 is a plan view of a device embodying my invention.
Figure 2:
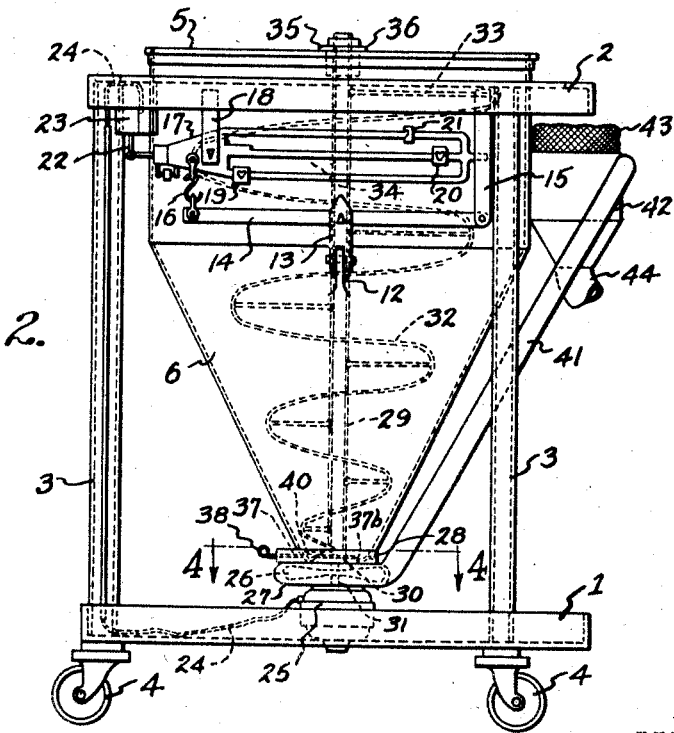
Figure 2 is a front elevation of the same.

The agitator 32, of spiral conical shape, preferably made of a heavy wire bent to such shape, is mounted on the tubular shaft 29 by upper arms 33 and 34 and successively shorter lower arms as clearly seen in Fig. 1. This agitator preferably is of sufficiently less radial extent than the interior of the lower conical part 6 of the hopper to exert an agitating effect on the contents without actually scraping the walls of the hopper; and its upper part has a similar relation to the cylindrical upper part of the hopper. The tubular shaft has its upper end part journaled in a bearing 35 on a yoke bar 36 extending across the top of the hopper 5 and having its ends bolted to the opposite rim portions of the hopper.

The sifter screen 37, shown clearly in Fig. 4, has one end semicircular to fit the screen casing 28, and its opposite end part generally rectangular to extend out through a slot in the screen casing 28 with opposite edge portions guided in guides on the walls of the screen casing, and with its outer end shaped to form a handle 38. So as to straddle the tubular shaft 29, the screen has a slot 37a, which is closed by a flat extension 37b on the adjacent part of the wall of the screen casing 28, when the screen is slid into operative position. The screen 37 has an upwardly opening recess or channel 39, annular in extent and concentric with the shafts 29 and 31, around next to the screen casing walls. The bottom terminal part of the spiral agitator 32 has an extension 40, preferably hooked around in the direction opposite to that of the agitator rotation, and sweeping across the top surface of the screen and over the annular channel 39. The operation of this combination is to throw, by centrifugal action, the larger particles of material that do not become disintegrated and sifted through the screen 37, out into the channel 39; keeping the screen 37 clear for free sifting therethrough. By sliding the screen out of its casing, these particles may be removed from the channel 39, and the screen may be cleaned. The extension 37b may also be of screen material instead of imperforate as shown, its purpose being to close the slot 37a, which if open would allow passage of the unsifted material.

Leading from the right hand side of the blower casing 27, at its front, and at a tangent to the circle of rotation of the blower vanes 26, is the discharge pipe or conduit 41. It curves upwardly and extends upwardly and outwardly along the side of the conical lower part 6 of the hopper 5 to enter the side of the cyclone separator casing 42, mounted on the side of the upper cylindrical part of the hopper 5. In its approach to this casing 42, the conduit 41 curves into a horizontal plane and curves partly around the casing 42, to enter it at a tangent to the circular cross section of the casing. The discharge into this casing 42 therefore is circular or spiral in direction; so that the flour or like material is carried around with the air, and, being the heavier, drops from the air into the inverted conical bottom of the casing 42, while the air leaves through the pervious bag 43 that forms the top of the cyclone separator casing 42 and is of such mesh that it allows the air to escape while preventing the escape of the flour or like material. The conical bottom of the casing 42 has at its lower end the discharge spout 44, which is partly shown and will be understood to be of any length or shape to form communication with apparatus, such as a mixer, into which the material is discharged. It may be a flexible tube.

It will be seen that the entire apparatus including the hopper, the motor, blower, sifter, agitator and the cyclone separator and connections, is hung on the scale beam 17. The dead weight of all of this apparatus is compensated, so that the scale indicates the net weight of the contents, by a leverage ratio determined by properly locating the suspension of the floating beam 14 and its connecting link 13 by which it supports the front of the hopper 5. This hopper swings with this beam 14 and the scale beam 17, pivoting at the rear on the balls 11 in the sockets 9 and 10 as previously described. The switch 23 is so arranged that current to the motor 25 is interrupted when the scale beam 17 tips upward at the instant of completion of discharge of the weight of material for which the upper poises 20 and 21 were set to the left, as before explained. Thus, a definite amount of material may be weighed into the hopper by use of the lower poise 19, moved to the right; and a definite predetermined weight of material may be discharged, which will be automatically determined once the discharge poises 20 and 21 have been set to the correct position on the scale beam 17.

In this example of Figs. 1 to 5, the action of the air, drawn down through the tubular shaft 29 by the blower 26, under the sifter screen 37, is to thoroughly diffuse the material coming through the screen under the action of the agitator 32 and its lower terminal part 40, scraping the screen; and this diffused condition of the material is maintained up to the point of delivery to other apparatus, by the action of the cyclone separating action in the casing 42. When delivered in this condition, the flour or the like is adapted to be mixed or otherwise operated upon in the receiving apparatus with the greatest uniformity and efficiency, and purer air is received at the top inlet.

It will be seen therefore that the apparatus just described is adapted to deliver the material in condition for most efficient after treatment, and in exact amount, in repeated portions; it being necessary only to reset the total weight poise 19, which will again close the switch 23 for a succeeding automatically determined discharge in accordance with the setting of the upper or discharge poises 20 and 21.

In the example of Figs. 6, 7 and 8, the hopper 5a is like that of the first example in its upper cylindrical part; and the frame and the scale suspension of the hopper thereon are the same as in the first example, as before explained. The lower part 6a of the hopper is conical, but is shorter than that of the first example; and it is provided on its bottom with a downwardly and laterally opening outlet casing 6b on the bottom of which casing the motor 25a is mounted, reinforced by a bracing bracket 45, and with a reducing gearing unit 46, the casing of which forms the connection of the upper end of the motor to the casing 6b. This mounting of the motor is so designed that the motor shaft inclines upwardly to the right; and connected to the reducing gearing unit 46 and inclining in the same direction is the conveyor shaft 47 carrying the spiral screw conveyor 48 in the conduit 49, the lower end of which leads up from a lateral extension of the outlet casing 6b, along the conical bottom 6a. This conduit 49, with the screw conveyor 48 therein continues up past the conical bottom 6a, with the upper end of the conduit about at the height of the top of the apparatus and having a closure plate with a central bearing 50 for the upper end part of the conveyor shaft 47. Just below the upper end of the conduit is an outwardly and downwardly opening outlet into a discharge spout 51 that flares downwardly in an outwardly inclined direction from the outlet. Across this outlet is a sifter screen 52.

In this example, there is no blowing action; the conveyor screw 48, by its lower end portion opposite the outlet from the hopper, in the outlet casing 6b, acting to agitate the material and cause it to freely descend into the lower end of the conveyor conduit 49. The conveyor screw 48 carries this material up through the conduit 49 and forces it out through the sifter screen 52 and spout 51; the conveyor screw 48 acting to scrape the sifter screen and cause a uniform diffusion of the material discharged through the spout into such apparatus, as for example a mixer, as it is desired to supply with the material. It will be seen that the weighing of the material, and the automatic determination of the weight of material discharged, are effected by means of the scale and the motor current control by the switch 23, as in the first example.

Figure 9:
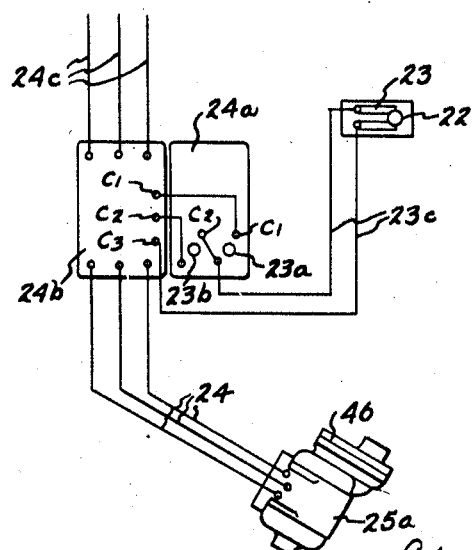
Figure 9 is a diagram of the connections of the manual and automatic switches to the motor of either example.

For manual control of current to the motor, I prefer to provide in conjunction with the automatically scale-operated switch 23, a starting button switch 23a and a stopping button switch 23b, as shown diagrammatically in Fig. 9; these being mounted on the cover 24a of the switch box 24b and connected with the automatic switch 23 by wires 23c, and with the motor 25a by the wires 24; the lead-in wires from the current source being represented at 24c. This arrangement will be understood to apply to the motor 25 of Figs. 1 to 5, inclusive, as well as to the motor 25a of the second example of Figs. 6, 7 and 8, represented in the diagram.

With either device mounted to be rolled about, as indicated, and with the discharge spout at the upper part of one side of the apparatus, it will be seen that the apparatus may be placed in relation to another apparatus, as a mixer, to discharge the prepared and definitely weighed material thereinto with the greatest of convenience; and that the apparatus may thus be brought into such relation with any one of any number of receiving devices with equal convenience. The compact and simple construction of the apparatus affords not only a saving in first cost and cost of maintenance, but also a saving in floor space, and its minimized weight and bulk adapt it for portable use in the manner described. It is thus especially adapted for use by small baking establishments and the like, where a small investment and economical operation are especially desirable, and where floor space is necessarily limited.

While I have illustrated and described only two examples of my invention, and these rather specifically, as is required, it will be understood that other modifications may occur in practice, to meet different conditions or the preferences of users, and that I am not limited to the precise disclosure herein, but what I claim as new and desire to secure by Letters Patent is:

1. In apparatus of the character described, a container, a blower communicating with the bottom of the container to receive material therefrom, a tubular shaft extending down through the interior of the container, with an inlet at its top and with an outlet at its bottom into the blower, an agitator rotatable with said shaft in the container, and means for driving the blower and rotating said shaft and agitator, said blower having an outlet leading upwardly therefrom.

2. In apparatus of the character described, a container, a blower communicating with the bottom of the container to receive material therefrom, means interposed between the blower and the interior of the container to sift material as it passes from the container into the blower, agitating means in the container, comprising a hollow shaft to admit air to the blower from the top of the apparatus, said blower having an outlet leading upwardly therefrom, and means for driving the blower and the agitator.

3. In apparatus of the character described, a container having a downwardly opening outlet, a sifter screen across said outlet, having a receptacle around its outlying part, and means adapted to sweep around adjacent to the upper surface of the screen to promote the sifting of material through the screen, and, by centrifugal action, to throw unsifted material into said receptacle.

4. In apparatus of the character described, a container having a downwardly opening outlet, a sifter screen across said outlet, mechanism for promoting passage of material through the screen, comprising a shaft extending through the screen, and means supporting the screen for withdrawal laterally from its position across the outlet, said screen having a portion constructed to allow it to pass said shaft upon withdrawal.

EDWARD J. LAUTERBUR.